United States Patent
Wagner et al.

(10) Patent No.: US 12,257,556 B2
(45) Date of Patent: Mar. 25, 2025

(54) FIBER BUNDLE HANDOVER

(71) Applicant: GAMBRO LUNDIA AB, Lund (SE)

(72) Inventors: Steffen Wagner, Messtetten (DE); Marco Soell, Hechingen (DE); Ralf Hautmann, Bisingen (DE)

(73) Assignee: GAMBRO LUNDIA AB, Lund (SE)

( * ) Notice: Subject to any disclaimer, the term of this patent is extended or adjusted under 35 U.S.C. 154(b) by 279 days.

(21) Appl. No.: 17/779,691

(22) PCT Filed: Dec. 21, 2020

(86) PCT No.: PCT/EP2020/087372
§ 371 (c)(1),
(2) Date: May 25, 2022

(87) PCT Pub. No.: WO2021/123406
PCT Pub. Date: Jun. 24, 2021

(65) Prior Publication Data
US 2023/0008282 A1    Jan. 12, 2023

(30) Foreign Application Priority Data
Dec. 21, 2019 (EP) .................... 19219181

(51) Int. Cl.
*B01D 69/08*     (2006.01)
*B01D 63/02*     (2006.01)
(Continued)

(52) U.S. Cl.
CPC ..... *B01D 69/0871* (2022.08); *B01D 63/0233* (2022.08); *B65H 57/12* (2013.01);
(Continued)

(58) Field of Classification Search
CPC ...... B65H 57/006; B65H 57/12; B65H 57/14; B65H 57/28; B65H 54/02; B65H 54/026; B65H 54/26; B65H 54/2893; B65H 54/71; B65H 54/56; B65H 54/88; B65H 75/4402; B65H 2701/31; B65H 2701/32; B65H 2701/33; B65H 2406/122; B65H 2406/30; B65H 2406/334; B65H 2406/342; B65H 2406/3432; B65H 54/28; B65H 75/4405; B65H 2701/312; B01D 63/021; B01D 63/0231; B01D 23/0232; B01D 63/0233;
(Continued)

(56) References Cited

U.S. PATENT DOCUMENTS 3,570,339 A * 3/1971 Vandersip ............... B65H 54/88
28/255
3,912,185 A * 10/1975 Yamada ................ B65H 57/28
242/364.11
(Continued)

FOREIGN PATENT DOCUMENTS

EP    0873962    10/1998

OTHER PUBLICATIONS

PCT Search Report and Written Opinion prepared for PCT Application No. PCT/EP2020/087372, completed Mar. 29, 2021.

Primary Examiner — Michael R Mansen
Assistant Examiner — Raveen J Dias
(74) Attorney, Agent, or Firm — Barnes & Thornburg LLP

(57) ABSTRACT

The present disclosure relates to a process and a device for winding a strand of hollow fiber membranes.

18 Claims, 5 Drawing Sheets

(51) Int. Cl.
*B65H 57/12* (2006.01)
*B65H 57/14* (2006.01)
*B65H 57/28* (2006.01)

(52) U.S. Cl.
CPC ............. *B65H 57/14* (2013.01); *B65H 57/28* (2013.01); *B65H 2406/30* (2013.01); *B65H 2406/3432* (2013.01)

(58) Field of Classification Search
CPC . B01D 69/087; B01D 69/0871; G02B 6/4457
USPC .................................. 226/92, 97.4
See application file for complete search history.

(56) References Cited

U.S. PATENT DOCUMENTS

| | | | | |
|---|---|---|---|---|
| 3,939,639 | A * | 2/1976 | Ellegast | B65H 57/12 264/289.3 |
| 3,944,166 | A * | 3/1976 | Hermanns | B65H 59/105 226/97.4 |
| 4,127,983 | A * | 12/1978 | Munker | D01H 15/007 242/562.1 |
| 4,164,331 | A * | 8/1979 | Henrich | B65H 57/12 242/157 R |
| 4,310,126 | A * | 1/1982 | Norleen | B65H 54/54 242/615.3 |
| 4,343,668 | A | 8/1982 | Francisoud et al. | |
| 4,412,371 | A * | 11/1983 | Hagen | B65H 51/16 28/255 |
| 4,817,880 | A * | 4/1989 | Lenk | B65H 51/22 226/97.4 |
| 4,819,422 | A * | 4/1989 | Stahlecker | B65H 59/005 57/328 |
| 5,322,228 | A * | 6/1994 | Nagayama | B65H 57/003 242/487.3 |
| 5,323,982 | A * | 6/1994 | Ligon | D02H 1/00 242/131 |
| 5,619,780 | A * | 4/1997 | Potter | D02G 1/167 28/258 |
| 5,746,072 | A * | 5/1998 | Bohnke | B65H 20/14 34/640 |
| 6,027,062 | A * | 2/2000 | Bacon | B65H 67/052 242/157.1 |
| 6,210,143 | B1 * | 4/2001 | Takagi | D01D 7/00 425/464 |
| 8,327,901 | B2 * | 12/2012 | Barra | B01D 65/003 156/425 |
| 8,764,925 | B2 * | 7/2014 | Barra | B01D 63/0233 156/169 |
| 9,387,945 | B2 * | 7/2016 | Reuschenbach | B01D 65/003 |
| 10,969,556 | B1 * | 4/2021 | Gardner | B65H 54/86 |
| 2003/0080170 | A1 * | 5/2003 | Rajala | B65H 59/38 242/364.11 |
| 2003/0080230 | A1 * | 5/2003 | Rajala | B65H 59/38 242/364.11 |
| 2005/0161550 | A1 * | 7/2005 | Fukuishi | B65H 57/003 242/476.7 |
| 2010/0051180 | A1 | 3/2010 | Barra et al. | |
| 2010/0224548 | A1 * | 9/2010 | Tada | B01D 63/0231 210/321.8 |
| 2013/0086872 | A1 * | 4/2013 | Barra | B01D 69/08 53/430 |
| 2014/0230369 | A1 * | 8/2014 | Reuschenbach | B01D 65/003 53/399 |
| 2016/0264375 | A1 * | 9/2016 | Hatta | B65H 57/16 |
| 2018/0051394 | A1 | 2/2018 | Kaestner | |
| 2019/0023522 | A1 * | 1/2019 | Bahlmann | B65H 54/88 |

\* cited by examiner

FIBER BUNDLE HANDOVER

CROSS REFERENCE TO RELATED APPLICATIONS

This application is a national stage entry under 35 U.S.C. § 371(b) of PCT International Application No. PCT/EP2020/087372, filed Dec. 21, 2020, which claims the benefit of European Patent Application Serial No. 19219181.5, filed on Dec. 21, 2019, the entire disclosures of both of which are incorporated herein by reference.

TECHNICAL FIELD

The present disclosure relates to a process and a device for winding a strand of hollow fiber membranes.

BACKGROUND OF THE INVENTION

Capillary dialyzers are widely used for blood purification in patients suffering from renal insufficiency, i.e., for treatment of the patients by hemodialysis, hemodiafiltration or hemofiltration. Capillary filters are widely used for the filtration of water and other liquids.

These devices generally consist of a casing comprising a tubular section with end caps capping the mouths of the tubular section. A bundle of hollow fiber membranes is arranged in the casing in a way that a seal is provided between the first flow space formed by the fiber cavities and a second flow space surrounding the membranes on the outside. Examples of such devices are disclosed in EP 0 844 015 A2, EP 0 305 687 A1, and WO 01/60477 A2.

US 2010/051180 A1 discloses an apparatus for the reeling up of hollow fiber membrane bundles for the manufacture of dialysis filters, comprising a reel carrier rotatable around a main axis and comprising at least two reels which are rotatably supported on the reel carrier, wherein the axes of rotation of the reels stand perpendicular on the main axis of the reel carrier.

EP 0 873 962 A1 discloses an apparatus for threading a fiber that is being continuously supplied by a supplying device for winding on a spool, including a collecting device adjacent to the supplying device that collects the fiber by urging the fiber from the supplying device into the collecting device to provide a tension in the fiber between the supplying device and the collecting device, a positioning device that engages the fiber, between the supplying device and the collecting device, with an engaging portion that allows the fiber to be continuously collected in the collecting device and that moves from a position adjacent to the supplying device and the collecting device to a position adjacent to the spool to move the fiber to at least one threading position, and a threading device that automatically threads the fiber at the at least one threading position onto the spool.

US 2018/051394 A1 describes a reel changing device for reeling fiber bundles from a fiber strand exiting a spinning device, including at least a first reel carrier and a second reel carrier on each of which a reel suited for winding up the fiber strand is arranged and which are movably received and guided in at least a first reel guide and a second reel guide so that the reels are adapted to be positioned one after another in an exit direction of the fiber strand so as to enable, in the case of a reel change, the fiber strand to be directly transferred from the first reel arranged on the first reel carrier to the second reel arranged on the second reel carrier.

U.S. Pat. No. 4,343,668 A discloses a method of making a plurality of bundles of hollow fibers with potted ends. A plurality of channels are mounted, one or each side of the periphery of a polygonal wheel, with the open side of each channel facing radially outwardly. A hollow fiber, or a hank of hollow fibers, are fed to the wheel, which is rotated so that the fibers engage in the channels, and build up therein to form a bundle in each channel. Glue is applied by causing the fiber or fibers to engage intermittently on a glueing roller located upstream of the wheel, so that the glue is located at spaced intervals only on the fiber or fibers corresponding to the locations at which potting is required. The fibers are cut adjacent the point where the glue is applied.

The bundles of hollow fiber membranes are usually cut from strands of hollow fiber membranes wound on a reel. In a typical process, a plurality of hollow fiber membranes is continually spun, and the plurality of fibers are wound onto a reel to produce a fiber strand comprising the desired number of hollow fibers.

A pair of winding reels is used for a continuous production process, and the plurality of fibers are alternately wound onto the first and the second reel. Whenever the desired number of fibers has been wound onto one of the reels, the plurality of fibers are cut and wound onto the other reel.

During start-up of the continuous process, manual interaction with the winding reels is required to attach the plurality of hollow fiber membranes to the winding reel, so that a fiber strand can be wound onto the reel. Also, during the change between the winding reels, manual interaction is required to attach the plurality of fibers to the alternate reel. Manual interaction with rotating winding reels is a potential safety risk to an operator.

In order to maximize efficiency and safety of the process, it would be desirable to have a fully automated production process.

SUMMARY OF THE INVENTION

A winding device for hollow fiber membranes is provided, as well as a fully automated continuous process for winding strands of hollow fiber membranes. The device and the process also abolish the need of manual interaction with rotating winding reels during start-up of the process which could pose a safety risk to an operator.

SHORT DESCRIPTION OF THE DRAWINGS

DETAILED DESCRIPTION

Figure 1:
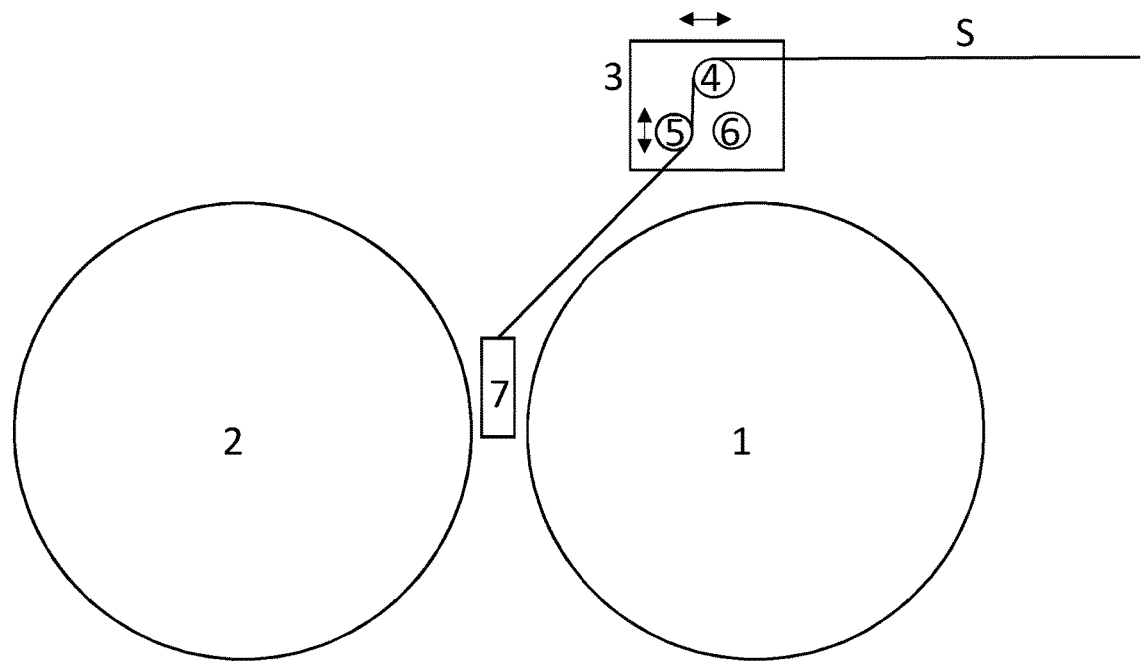
FIG. 1 shows a schematic view of an exemplary embodiment of the winding device of the present disclosure.

A device for continuously winding strands of hollow fiber membranes is provided. The device comprises a first winding reel and a second winding reel, a fiber-guiding unit comprising three rollers, a fiber-cutting mechanism, and an air amplifier configured to suck in a plurality of hollow fiber membranes through a first aperture and eject them through a second aperture.

The device of the present disclosure comprises a first winding reel and a second winding reel. The winding reels are circular and have the same diameter. The first winding reel and the second winding reel are spaced apart from each other, i.e., there is a gap between the perimeter of the first winding reel and the perimeter of the second winding reel. The first and the second winding reel are configured to rotate in opposite directions, e.g., the first winding reel is configured to rotate in a counter-clockwise direction, and the second winding reel is configured to rotate in a clockwise direction. The first and the second reel are aligned.

The device of the present disclosure comprises a fiber-guiding unit comprising three rollers. The fiber-guiding unit bundles the plurality of hollow fiber membranes and guides them towards the periphery of one of the winding reels. In one embodiment, the fiber-guiding unit is located above the apex of the winding reels.

The fiber-guiding unit is moveable in a direction defined by connecting the centers of the first winding reel and the second winding reel. In a further embodiment, wherein the first and the second winding reel are aligned, and their axes are located at the same level, the fiber-guiding unit is moveable in horizontal direction.

In one embodiment, the three rollers form a triangle, with one of the rollers being located above the other two rollers, and the plane defined by the triangle is perpendicular to the axes of the first winding reel and the second winding reel. In a further embodiment, the plane of the triangle formed by the rollers is aligned with the winding reels. In a further embodiment, one roller of the three rollers is moveable in a direction perpendicular to the direction of the movement of the fiber-guiding unit. In an embodiment wherein the fiber-guiding unit is moveable in horizontal direction, the roller is moveable in vertical direction. In one embodiment, the moveable roller is one of the two rollers located below the third roller.

The device of the present disclosure comprises a fiber-cutting mechanism. The fiber-cutting mechanism is configured to cut the plurality of hollow fiber membranes supplied via the fiber-guiding unit. In one embodiment, the fiber-cutting mechanism is moveable. In a further embodiment, the fiber-cutting mechanism is attached to the fiber-guiding unit.

The device of the present disclosure comprises an air amplifier configured to suck in a plurality of hollow fiber membranes through a first aperture (inlet) and eject it through a second aperture (outlet). The air amplifier is configured to suck in the plurality of hollow fiber membranes supplied by the fiber-guiding unit, thereby applying a pulling force onto the plurality of hollow fiber membranes, so that the fibers are taut between the fiber-guiding unit and the first aperture (inlet) of the air amplifier.

In one embodiment, the air amplifier is L-shaped, and the first aperture and the second aperture are located at the ends of the L. In a further embodiment, the air amplifier is located at a position between the first and the second winding reel with the second aperture pointing in a direction parallel to the axes of the winding reels.

In one embodiment, the air amplifier is configured to eject the plurality of fibers in a direction which is parallel to the axes of the first winding reel and the second winding reel, i.e., perpendicular to the plane of the first or the second winding reel, respectively. In another embodiment, the air amplifier is configured to eject the plurality of fibers in a direction which is in the plane of the first winding reel.

In one embodiment, the air amplifier is moveable in a direction which is parallel to the axes of the first winding reel and the second winding reel i.e., perpendicular to the plane of the first or the second winding reel, respectively.

Figure 8:
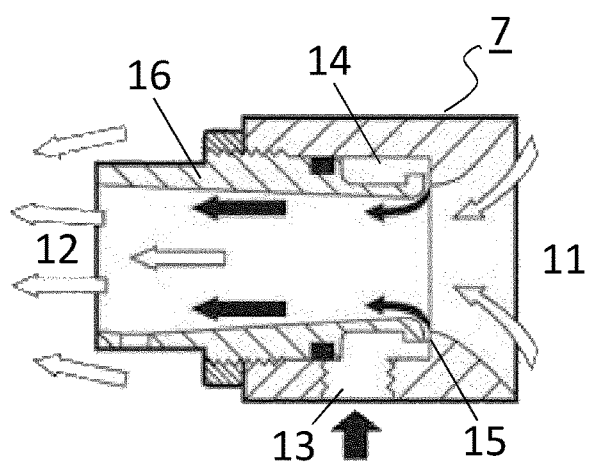
FIG. 8 is a schematic longitudinal-sectional view of an air amplifier.

Suitable air amplifiers are known to the person skilled in the art and are commercially available from various sources. An exemplary air amplifier is shown in FIG. 8.

The present disclosure also provides a fully automated continuous process for winding strands of hollow fiber membranes which uses the device of the present disclosure. In the process, a plurality of hollow fiber membranes is alternately wound on the first and the second winding reel of the device. Whenever the desired number of hollow fiber membranes has been wound onto one winding reel, the plurality of fibers are cut and winding onto the other winding reel is started. The fiber strand that has been wound onto the previous reel is cut into bundles and removed from the reel, so that it is ready for winding another strand of hollow fiber membranes when the desired number of fibers has been wound onto the other reel.

The present disclosure also provides a process for attaching a plurality of hollow fiber membranes to a first winding reel. This process is executed during startup of the continuous winding process.

The process comprises the steps of a) guiding the plurality of hollow fiber membranes over a first roller and a second roller of a fiber-guiding unit located above the first winding reel and subsequently through an air amplifier located below the fiber-guiding unit and adjacent to the periphery of the first winding reel; b) starting rotation of the first winding reel; moving the fiber-guiding unit and/or the second roller until the plurality of hollow fiber membranes contacts the rotating first winding reel and are picked up and carried along by the rotating first winding reel; cutting the plurality of hollow fiber membranes between the first winding reel and the air amplifier.

In the first step of the process, the plurality of hollow fiber membranes are guided over a first roller and a second roller of a fiber-guiding unit located above the first winding reel and subsequently through an air amplifier located below the fiber-guiding unit and adjacent to the periphery of the first winding reel. During this step, the first winding reel is at a standstill, so that it does not pose a safety risk to an operator. In an embodiment of the process, the plurality of hollow fiber membranes are threaded over the rollers and conducted towards the inlet of the air amplifier manually. In another embodiment, the plurality of fibers supplied by a spinning device are automatically threaded through the fiber-guiding unit and fed to the air amplifier by means of baffles and feed hoppers, respectively.

One embodiment of the process uses a modified step (a). After leaving the fiber-guiding unit, the plurality of hollow fiber membranes are guided over an additional roller attached to a cassette which is mounted on the periphery of the first winding reel, and through the cassette and subsequently through an air amplifier located below the fiber-guiding unit and adjacent to the periphery of the first winding reel, near the apex of the first winding reel.

The device and process of the present disclosure will now be further explained by referring to the accompanying figures.

FIG. 1 shows a schematic view of an exemplary embodiment of the winding device of the present disclosure. A first winding reel 1 and a second winding reel 2 are shown. The axes of the reel 1, 2 are parallel to each other and on the same level; the reels are also aligned. A moveable fiber-guiding unit 3 is located above the winding reels 1, 2. The double-headed arrow above the unit 3 indicates the direction of movement, i.e., the unit 3 can be moved in horizontal direction. The fiber-guiding unit 3 comprises three rollers 4, 5, 6, a first roller 4 being located above the second roller 5 and the third roller 6. The second roller 5 is moveable in vertical direction, as indicated by the double-headed arrow next to it. An air amplifier 7 is located between the first winding reel 1 and the second winding reel 2.

A strand S formed by a plurality of hollow fiber membranes is also shown in FIG. 1. The plurality S of fibers are supplied by a continuously working spinning device (not shown). As shown in FIG. 1, the hollow fiber membranes are guided over the first roller 4 and under the second roller 5 and fed to the inlet of the air amplifier 7. The outlet of the air amplifier 7 (not shown) points in a direction perpendicular to the plane of the winding reels 1, 2 and ejects the fibers in that direction. FIG. 1 shows the device before the continuous winding process is running, i.e. at the beginning of the start-up phase.

Figure 2:
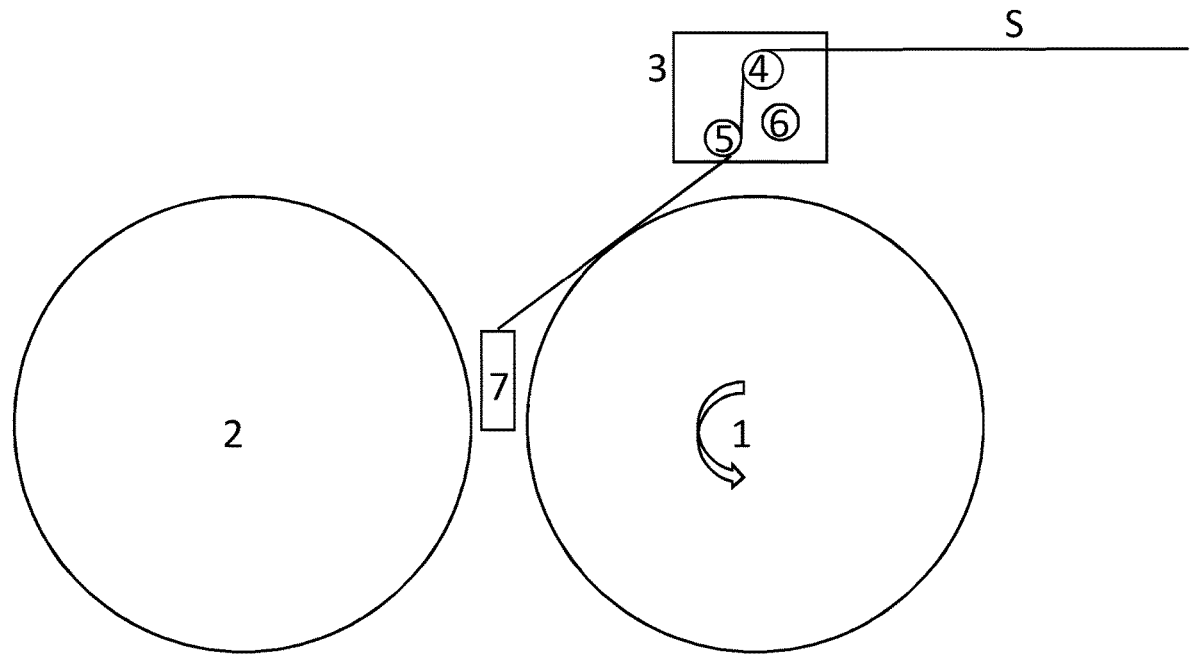
FIG. 2 is an illustration of a stage of an embodiment of the process of the present disclosure.

FIG. 2 is an illustration of a stage of an embodiment of the process for attaching a plurality of hollow fiber membranes to a first winding reel 1. Coming from the configuration shown in FIG. 1, counter-clockwise rotation of the winding reel 1 is started, as indicated by the arrow. The fiber-guiding unit 3 is moved horizontally, and the second roller 5 is moved vertically towards the winding reel 1, until the plurality S of hollow fiber membranes touch the periphery of the rotating winding reel 1 and are picked up and carried along by the rotating first winding reel 1. The plurality S of hollow fiber membranes are then cut by the fiber-cutting mechanism at a position between the first winding reel 1 and the air amplifier 7.

This marks the beginning of the fully automated continuous winding process. The plurality S of hollow fiber membranes are wound onto the first winding reel 1 until the desired number of hollow fiber membranes has been collected. The next stage of the process is shown in FIG. 3.

Figure 3:
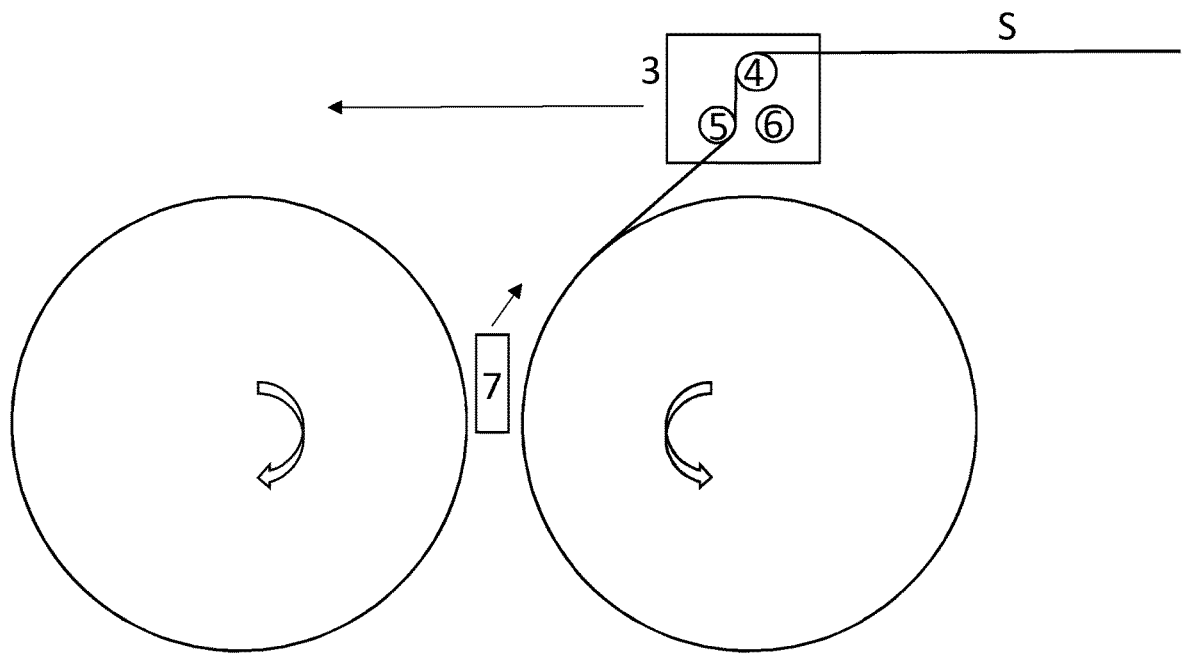
FIG. 3 is an illustration of a further stage of the process shown in FIG. 2.
Figure 4:
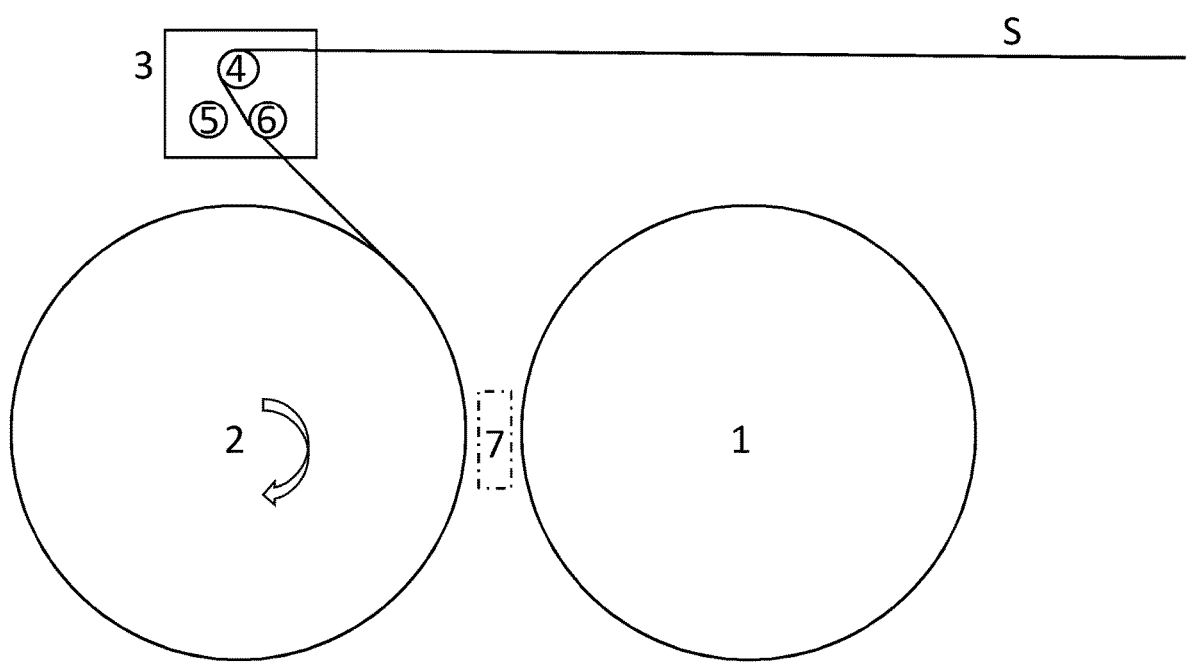
FIG. 4 is an illustration of a further stage of the process shown in FIG. 2.

FIGS. 3 and 4 illustrate a further stage of the continuous winding process. Clockwise rotation of the second winding reel 2 is started and the air amplifier 7 is moved in a direction perpendicular to the plane of the winding reels 1, 2 as indicated by the arrow, in order to clear the way for the plurality S of hollow fiber membranes. The rotation of the first winding reel 1 is stopped, and the fiber-guiding unit 3 is moved in horizontal direction towards the second winding reel 2, until the plurality S of hollow fiber membranes touch the periphery of the rotating winding reel 2 and are picked up and carried along by the rotating second winding reel 2. The plurality S of hollow fibers are cut by the fiber-cutting mechanism, and the plurality S of hollow fiber membranes are wound onto the second winding reel 2 until the desired number of hollow fiber membranes has been collected. The rotation of the second winding reel 2 then is stopped, the rotation of the first winding reel 1 is started, and the fiber-guiding unit 3 moves back in horizontal direction towards the first winding reel 1 until the plurality S of hollow fiber membranes touch the periphery of the rotating winding reel 1 and are picked up and carried along by the rotating first winding reel 1. The plurality S of hollow fiber membranes are cut by the fiber-cutting mechanism at a position between the first winding reel 1 and the second winding reel 2, and wound onto the first winding reel 1 until the desired number of hollow fiber membranes has been collected; etc.

Figure 5:
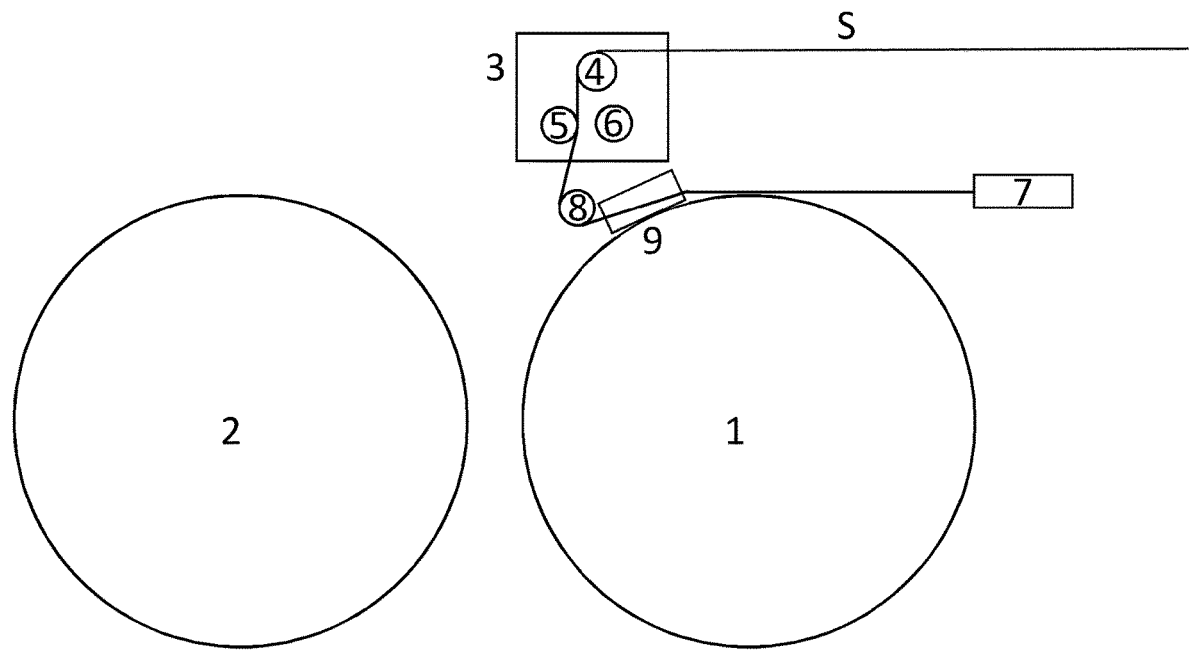
FIG. 5 shows a schematic view of another exemplary embodiment of the winding device of the present disclosure.

FIG. 5 shows a schematic view of another exemplary embodiment of the winding device of the present disclosure. In this embodiment, a cassette 9 having an additional roller 8 attached to it is mounted on the first winding reel 1. A plurality S of hollow fiber membranes are threaded in turn over a first roller 4, under a second roller 5 of a fiber-guiding unit 3, and over the roller 8 and through the cassette 9 into the inlet of an air amplifier 7. The air amplifier 7 is positioned below the fiber-guiding unit 3 and adjacent to the periphery of the first winding reel 1 near its apex. In one embodiment, the outlet (not shown) of the air amplifier 7 points in a direction perpendicular to the plane of the winding reel 1 and ejects the fibers in that direction. In another embodiment, the outlet (not shown) of the air amplifier 7 points in a direction tangential to the the winding reel 1 and ejects the fibers in that direction.

Figure 6:
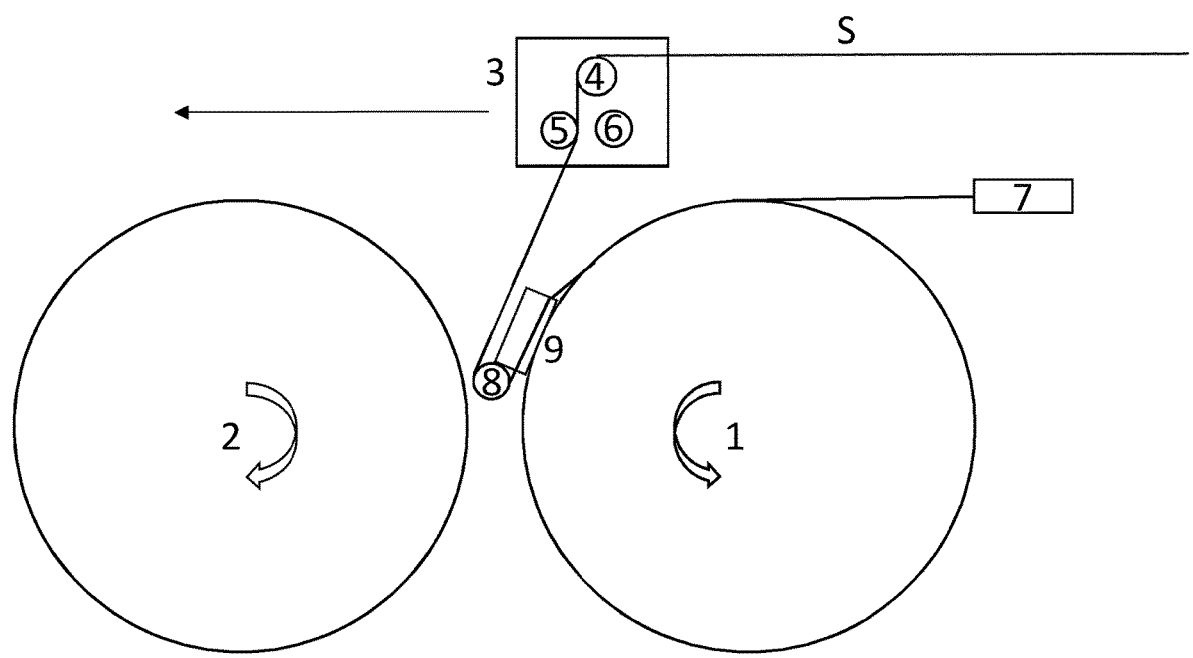
FIG. 6 is an illustration of a stage of another embodiment of the process of the present disclosure.
Figure 7:
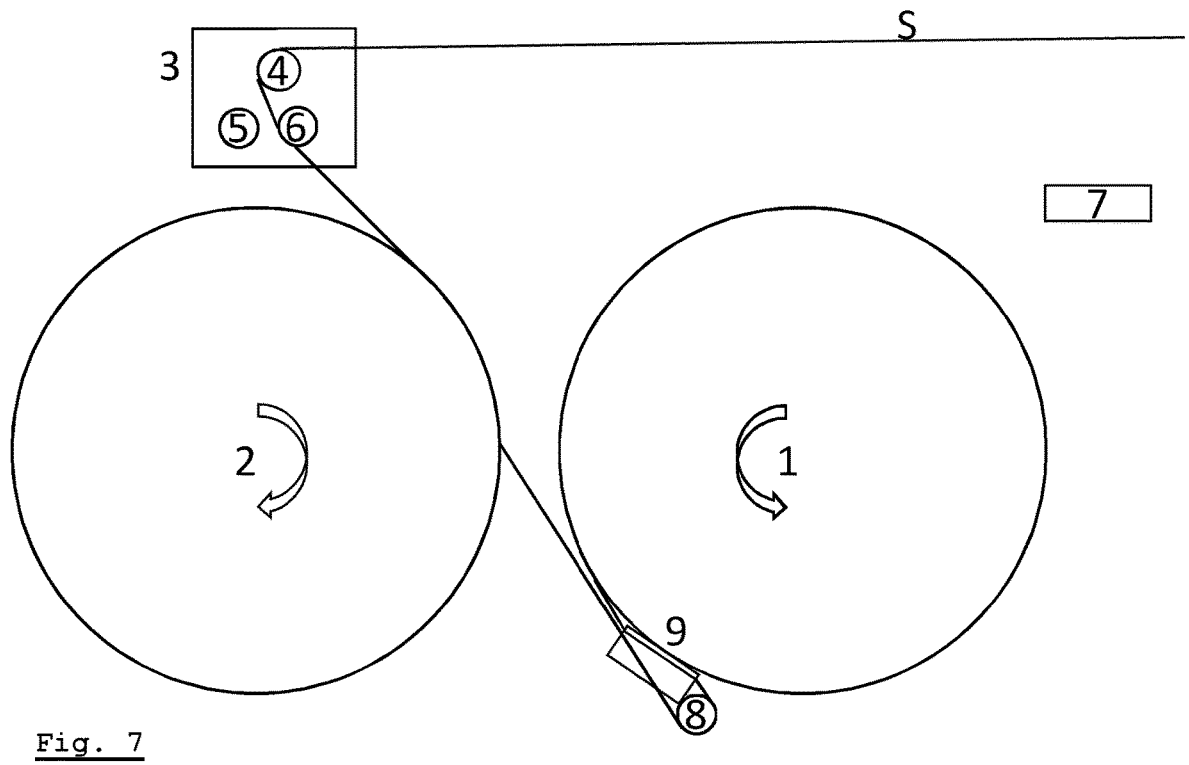
FIG. 7 is an illustration of a further stage of the process shown in FIG. 6.

FIGS. 6 and 7 illustrate stages of another embodiment of the process of the present disclosure. As shown in FIG. 6, rotation of both winding reels 1,2 is started. When the plurality S of hollow fiber membranes touch the periphery of the rotating winding reel 1 and are picked up and carried along by the rotating first winding reel 2, the plurality S of hollow fibers are cut by the fiber-cutting mechanism at a position between the first winding reel 1 and the inlet of the air amplifier 7. The fiber-guiding unit 3 is moved in horizontal direction towards the second winding reel 2, until the plurality S of hollow fiber membranes touch the periphery of the rotating winding reel 2 and are picked up and carried along by the rotating second winding reel 2. Rotation of the first winding reel 1 is stopped, and the plurality S of hollow fibers are cut by the fiber-cutting mechanism at a position between the first winding reel 1 and the second winding reel 2, and the plurality S of hollow fiber membranes are wound onto the second winding reel 2 until the desired number of hollow fiber membranes has been collected.

The cassette 9 is removed from the first winding reel 1. When the desired number of hollow fiber membranes has been wound onto the second winding reel 2, the rotation of the second winding reel 2 is stopped, rotation of the first winding reel 1 is started, and the fiber-guiding unit 3 is moved horizontally towards the first winding reel 1, until the plurality S of hollow fiber membranes touch the periphery of the rotating winding reel 1 and are picked up and carried along by the rotating second winding reel 1. The plurality S of hollow fibers are cut by the fiber-cutting mechanism at a position between the first winding reel 1 and the second winding reel 2. The fiber strand wound onto the second winding reel 2 is subsequently cut into bundles and removed from the second winding reel 2.

The plurality S of hollow fiber membranes are wound onto the first winding reel 1 until the desired number of hollow fiber membranes has been collected. Then the first winding reel 1 is stopped, rotation of the second winding reel 2 is started, the fiber-guiding unit 3 is moved horizontally towards the second winding reel 2, until the plurality S of hollow fiber membranes touch the periphery of the rotating winding reel 2 and are picked up and carried along by the rotating second winding reel 2. The plurality S of hollow fibers are cut by the fiber-cutting mechanism at a position between the first winding reel 1 and the second winding reel 2, and the winding process is continued as described above. The fiber strand wound onto the first winding reel 1 is subsequently cut into bundles and removed from the first winding reel 1.

FIG. 8 is a schematic longitudinal-sectional view of an air amplifier 7. The air amplifier 7 features an inlet 11 for ambient air, an inlet 13 for compressed air, and an air outlet 12. In the figure, the flow of ambient air is illustrated using white arrows and the flow of compressed air using black arrows. Compressed air 13 is injected through the inlet 13 into a ring chamber 14 and through a ring slit 15 into the nozzle 16. The flow of compressed air causes a vacuum at the inlet 11, sucking in ambient air and accelerating it towards the outlet 12. The air amplifier 7 forms a Venturi nozzle, its diameter decreasing from the inlet 11 to the ring slit 15, and then increasing towards the outlet 12. The nozzle 16 has a Coandă profile, so that the flow of compressed air adheres to the surface of the nozzle 16, further increasing efficiency of the air amplifier 7.

Figure 9:
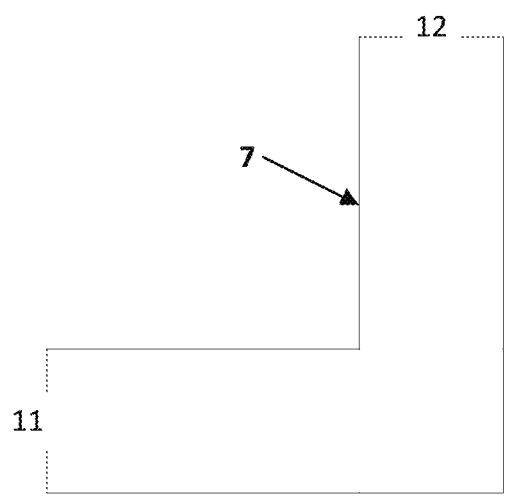
FIG. 9 is a schematic view of an air amplifier that is L-shaped.

FIG. 9 is another schematic view of an air amplifier 7. The air amplifier 7 is L-shaped and the first aperture 11 and the second aperture 12 are located at the ends of the L shaped air amplifier 7.

LIST OF REFERENCE SIGNS 1 first winding reel
2 second winding reel
3 fiber-guiding unit
4 first roller
5 second roller
6 third roller
7 air amplifier
8 roller
9 cassette
11 ambient air inlet
12 air outlet
13 compressed air inlet
14 ring chamber
15 ring slit
16 nozzle with Coandă profile

The invention claimed is:

1. A device for continuously winding strands of hollow fiber membranes, comprising
   i) a first winding reel and a second winding reel, wherein both the first winding reel and the second winding reel are circular and have the same diameter, wherein the first winding reel and the second winding reel are aligned and spaced apart from each other;
   ii) a fiber-guiding unit comprising three rollers, wherein the three rollers comprise a first roller, a second roller, and a third roller, wherein the fiber-guiding unit is moveable in a direction defined by connecting centers of the first winding reel and the second winding reel; and
   iii) an air amplifier configured to suck in a plurality of hollow fiber membranes through a first aperture and eject the plurality of hollow fiber membranes through a second aperture,
   wherein the air amplifier is configured to eject the plurality of hollow fiber membranes in a direction parallel to the axes of the first winding reel and the second winding reel.

2. The device of claim 1, wherein the first roller, the second roller, and the third roller form a triangle.

3. The device of claim 2, wherein the triangle defines a plane that is perpendicular to the axes of the first winding reel and the second winding reel, wherein the first roller is moveable in a direction perpendicular to the direction of the movement of the fiber-guiding unit.

4. The device of claim 1, wherein the air amplifier is L-shaped and wherein the first aperture and the second aperture are located at the ends of the L-shape.

5. The device of claim 1, wherein the first roller is located above the second roller and the third roller.

6. A process for attaching a plurality of hollow fiber membranes to the first winding reel of the device of claim 1, said method comprising the steps of:
   a) guiding the plurality of hollow fiber membranes over the first roller and the second roller of the fiber-guiding unit located above the first winding reel, and subsequently through the air amplifier located below the fiber-guiding unit and adjacent to a periphery of the first winding reel;
   b) starting rotation of the first winding reel;
   c) moving the fiber-guiding device and/or the second roller until the plurality of hollow fiber membranes contact the rotating first winding reel and are picked up and carried along by the rotating first winding reel; and
   d) cutting the plurality of hollow fiber membranes in-between the first winding reel and the air amplifier.

7. The process of claim 6,
   wherein in step (a), after leaving the fiber-guiding unit, the plurality of hollow fiber membranes are guided over a fourth roller attached to a cassette (9) and through the cassette and
   wherein the plurality of hollow fiber membranes are subsequently guided through the air amplifier.

8. The process of claim 7, wherein the cassette is mounted on the periphery of the first winding reel.

9. The process of claim 7, wherein the air amplifier is located below the fiber-guiding unit and adjacent to the periphery of the first winding reel.

10. A device for continuously winding strands of hollow fiber membranes, comprising
    i) a first winding reel and a second winding reel, wherein both the first winding reel and the second winding reel are circular and have the same diameter, wherein the first winding reel and the second winding reel are aligned and spaced apart from each other;
    ii) a fiber-guiding unit comprising three rollers, wherein the three rollers comprise a first roller, a second roller, and a third roller, wherein the fiber-guiding unit is moveable in a direction defined by connecting centers of the first winding reel and the second winding reel; and
    iii) an air amplifier configured to suck in a plurality of hollow fiber membranes through a first aperture and eject the plurality of hollow fiber membranes through a second aperture,
    wherein the air amplifier is moveable in a direction parallel to the axes of the first winding reel and the second winding reel.

11. The device of claim 10, wherein the first roller, the second roller, and the third roller form a triangle.

12. The device of claim 11, wherein the triangle defines a plane that is perpendicular to the axes of the first winding reel and the second winding reel, wherein the first roller is moveable in a direction perpendicular to the direction of the movement of the fiber-guiding unit.

13. The device of claim 10, wherein the air amplifier is L-shaped and wherein the first aperture and the second aperture are located at the ends of the L-shape.

14. The device of claim 10, wherein the first roller is located above the second roller and the third roller.

15. A process for attaching a plurality of hollow fiber membranes to the first winding reel of the device of claim 10, said method comprising the steps of:
    a) guiding the plurality of hollow fiber membranes over the first roller and the second roller of the fiber-guiding unit located above the first winding reel, and subsequently through the air amplifier located below the fiber-guiding unit and adjacent to a periphery of the first winding reel;
b) starting rotation of the first winding reel;
c) moving the fiber-guiding device and/or the second roller until the plurality of hollow fiber membranes contact the rotating first winding reel and are picked up and carried along by the rotating first winding reel; and
d) cutting the plurality of hollow fiber membranes in-between the first winding reel and the air amplifier.

16. The process of claim 15, wherein in step (a), after leaving the fiber-guiding unit, the plurality of hollow fiber membranes are guided over a fourth roller attached to a cassette (9) and through the cassette and wherein the plurality of hollow fiber membranes are subsequently guided through the air amplifier.

17. The process of claim 16, wherein the cassette is mounted on the periphery of the first winding reel.

18. The process of claim 16, wherein the air amplifier is located below the fiber-guiding unit and adjacent to the periphery of the first winding reel.

* * * * *